Figure 4:
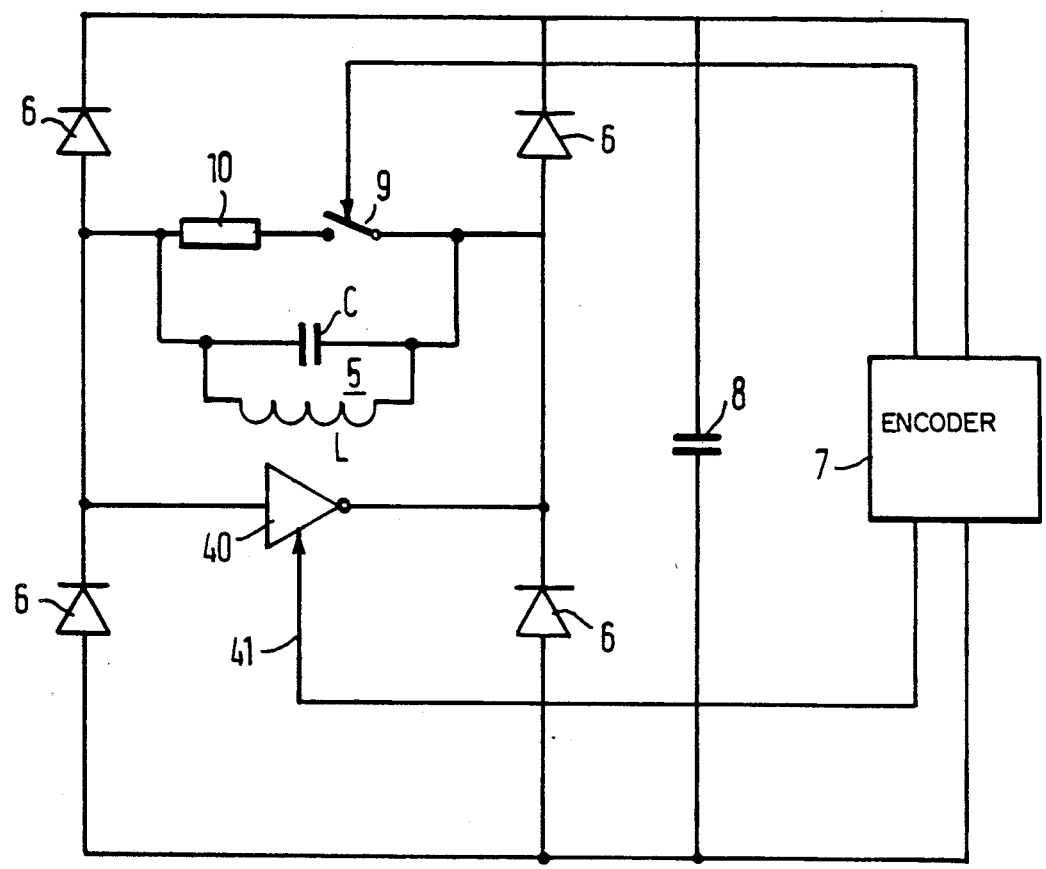

United States Patent [19]
Kip et al.

[11] Patent Number: 5,105,190
[45] Date of Patent: Apr. 14, 1992

[54] ELECTROMAGNETIC IDENTIFICATION SYSTEM

[75] Inventors: Harm J. Kip, Lichtenvoorde; Tallienco W. H. Fockens, Eibergen, both of Netherlands

[73] Assignee: N.V. Nederlandsche Apparatenfabriek Nedap, De Groenlo, Netherlands

[21] Appl. No.: 566,830

[22] Filed: Aug. 14, 1990

Related U.S. Application Data

[63] Continuation of Ser. No. 041,053, Apr. 22, 1987, abandoned.

[30] Foreign Application Priority Data

Apr. 22, 1986 [NL] Netherlands .................. 8601021

[51] Int. Cl.⁵ .................................................. H04Q 9/00
[52] U.S. Cl. .......................... 340/825.54; 340/825.34; 340/572
[58] Field of Search ............... 340/825.54, 825.31, 340/825.34, 825.69, 825.72, 568, 572; 235/380, 382, 382.5, 492; 342/42, 44, 51

[56] References Cited

U.S. PATENT DOCUMENTS

| | | | |
|---|---|---|---|
| 4,196,418 | 4/1980 | Kip et al. ............... | 340/825.54 |
| 4,333,072 | 6/1982 | Beigel .................... | 340/825.54 |
| 4,388,524 | 6/1983 | Walton .................... | 342/44 |
| 4,399,437 | 8/1983 | Falk et al. ............... | 235/380 |
| 4,473,825 | 9/1984 | Walton .................... | 340/825.54 |
| 4,546,241 | 10/1985 | Walton .................... | 342/44 |
| 4,630,044 | 12/1986 | Polzer .................... | 340/825.54 |
| 4,631,708 | 12/1986 | Wood et al. ............ | 340/825.54 |
| 4,654,658 | 3/1987 | Walton .................... | 340/825.54 |
| 4,691,202 | 9/1987 | Denne et al. ............ | 340/825.54 |

FOREIGN PATENT DOCUMENTS

| | | | |
|---|---|---|---|
| 3,412,588 | 10/1985 | Fed. Rep. of Germany | |
| 3,412,610 | 10/1985 | Fed. Rep. of Germany | |
| 2163324 | 2/1986 | United Kingdom ............... | 342/44 |
| WO86/00498 | 1/1986 | World Int. Prop. O. | |

Primary Examiner—Donald J. Yusko
Assistant Examiner—Edwin C. Holloway, III
Attorney, Agent, or Firm—Fleit, Jacobson, Cohn, Price, Holman & Stern

[57] ABSTRACT

An electromagnetic identfication system of the kind in which a transmitter generates an electromagnetic interrogation field in a detection zone. At least one passive responder is provided capable of disturbing the interrogation field. A detection circuit detects a disturbance of the interrogation field caused by a responder. The responder is a single receiver circuit which responds to the interrogation field which supplies energy to activate a digital encoding circuit having a binary-code defining circuit. The encoding circuit is arranged, in operation, through a switch to vary the electrical characteristics of the receiver circuit to generate a code signal that is detectable by the detection circuit. The encoding circuit is arranged to control the switch during the predetermined periods of time for varying the electrical characteristics of the receiver circuit. A programmer is provided to modulate the transitter to generate a modulated interrogation field.

11 Claims, 2 Drawing Sheets

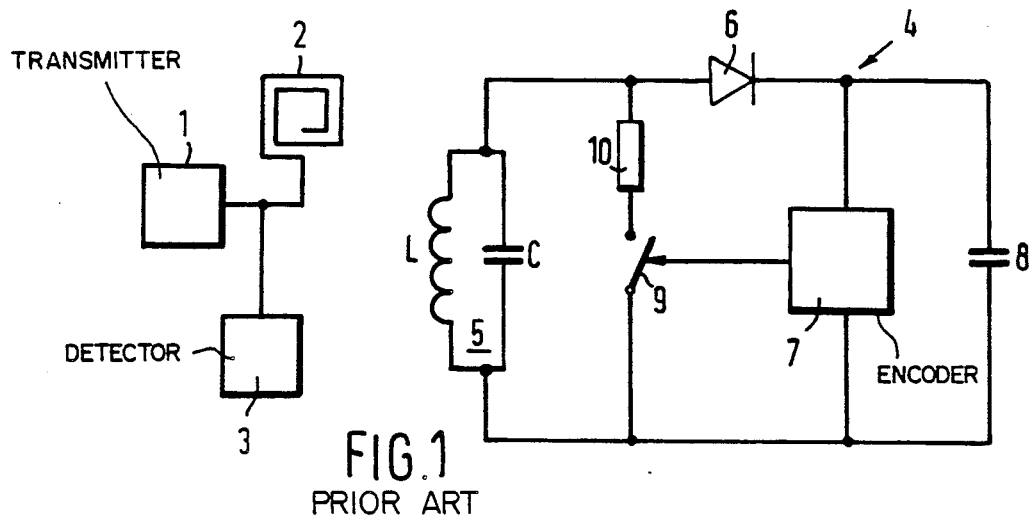
FIG. 1 PRIOR ART
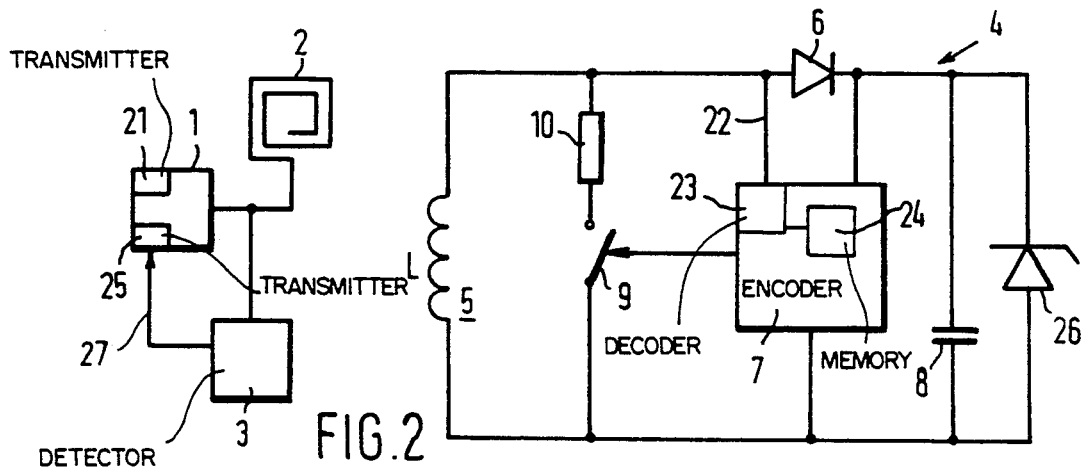
FIG. 2
FIG. 3
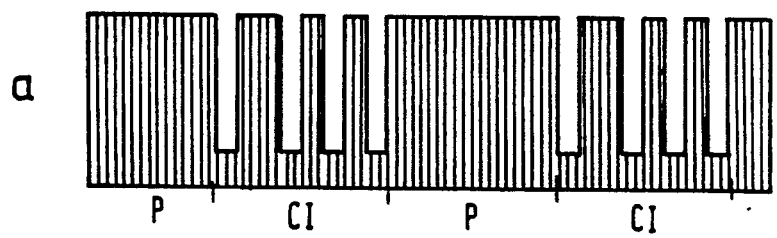
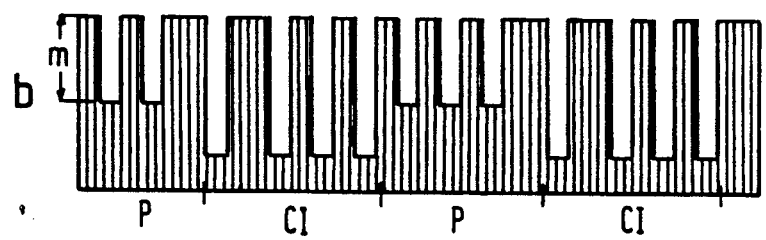

ELECTROMAGNETIC IDENTIFICATION SYSTEM

This is a continuation of application Ser. No. 07/041,053, filed Apr. 22, 1987, now abandoned.

This invention relates to an electromagnetic identification system.

Electromagnetic identification systems of the kind to which the invention relates are disclosed in, for example, Netherlands patent application 77,11891 and in U.S. Pat. No. 4,333,072.

These prior electromagnetic identification systems comprise a transmitter for generating an electromagnetic interrogation field in a detection zone, at least one passive responder capable of disturbing said interrogation field, and detection means for detecting a disturbance of the interrogation field caused by a responder, the responders comprising a single receiver circuit which in response to an interrogation field, via rectifier means, can supply energy to active digital encoding means comprising a binary-code defining means, said encoding means being arranged, in operation, through a switch means, to vary the electrical characteristics of said receiver circuit in the rhythm of the binary code to generate a code signal that is detectable by said detection means, said encoding means being arranged to control the switch member during pre-determined periods of time for varying the electrical characteristics of said receiver circuit, which pre-determined periods of time alternate with intervals during which the electrical characteristics of the receiver circuit are not affected.

It is also known for the encoded responders of an electromagnetic identification system to be arranged so that, after the actual production process of the responder, the code of each responder can, at least in part, be programmed or re-programmed. In the past, for example, it has been proposed for the responders to be arranged so that the desired code can be programmed in the responder by breaking certain electrical connections mechanically from the outside. It has also been proposed to make use of fusible links, which can be selectively broken by the wireless supply of sufficient energy.

Furthermore, it has been proposed in general, for example, in German patent application 3,412,610, German patent application 3,412,588, and the International Patent Application WO 86/00498, to use a memory means in a coded responder, in which data can be stored or changed by wireless means.

It is an object of the present invention to provide a practical technique for programming or re-programming the code of a responder of an electromagnetic identification system of the kind in which, in operation, the responders generate a code signal with intervals.

For this purpose, according to the present invention, an electromagnetic identification system of the above kind is characterized in that said encoding means comprise a decoding section which, in response to a modulation of the interrogation field, can, at least in part, change the binary code defined by said code-defining means, and that there is provided a transmitter comprising a programmer for providing such modulation, said transmitter being arranged, in operation, to generate a modulated interrogation field during said predetermined intervals.

The invention will now be described in more detail with reference to the accompanying drawings, in which:

FIG. 1 diagrammatically shows one example of a prior art identification system;

FIG. 2 diagrammatically shows one embodiment of an identification system according to the present invention;

FIG. 3 diagrammatically shows signal distortion occurring in the identification system as shown in FIG. 2; and FIG. 4 diagrammatically shows a variant of a responder for an identification system according to the present invention.

FIG. 1 diagrammatically shows an example of a prior art identification system comprising a transmitter 1 which by means of an aerial 2 can generate an interrogation field in a detection zone. Furthermore, detection means 3 are provided which, in this example, are connected to the same aerial as the transmitter, and can detect the field disturbance caused by a responder 4 present in the detection zone.

Responder 4 comprises a receiver circuit 5, which in this example is a tuned resonance circuit LC, but may alternatively be a wide-band circuit or an aerial, if desired.

Via a rectifier 6, shown diagrammatically, receiver circuit 5 provides supply energy to digital encoding means 7 when the responder is in an interrogation field. Furthermore, a buffer capacitor 8 is provided. The encoding means in operation provide a binary code signal that is unique for the responder in question or for the group to which the responder belongs. The code signal controls a switch member 9, for example, a transistor. The switch member affects the electrical characteristics of the receiver circuit 5 in the rhythm of the code signal. Thus, for example, the resonance frequency can be changed by short-circuiting a coil or capacitor forming part of the circuit. In the example shown, the receiver circuit is short-circuited via a resistor 10 in the rhythm of the code.

As, during the short-circuiting of the receiver circuit 5, the voltage provided by the rectifier falls off, at least in part, the responder is arranged so that the switch means can only affect the receiver circuit during certain periods of time. These periods of time alternate with pre-determined intervals during which the switch means is not energized. During these intervals, the buffer capacitor 8 can be fully charged again.

According to the present invention, these intervals can be utilized to advantage for sending out the information required for programming or re-programming the code of a responder, defined by a code defining means or memory of the encoding means.

For this purpose, the code defining means should naturally be re-programmable, at least in part. Such a code defining means may, for example, comprise a RAM or, for example, An E(E)PROM. In the case of a RAM, an auxiliary battery is often required.

FIG. 2 diagrammatically shows an example of an identification system according to the present invention, arranged so that the code of a responder can be programmed or changed, at least in part, after the actual production process. Similar parts are designated by the same reference numerals as used in FIG. 1.

The transmitter 1 now comprises a programmer 21, by means of which the interrogation field can be modulated during the pre-determined intervals in which the switch means 9 is not operative.

The modulated signal is supplied by the receiver circuit 5, which in this example only comprises a coil L, to the encoding means 7, via a line 22. The encoding means now comprise a decoding section 23, which decodes the signal received and, with the signals thus obtained, changes the contents of the code defining means 24.

In order to ensure that the modulation of the interrogation rotation field endangers the provision of energy to the active responder circuits as little as possible, the transmission energy is preferably set as high as possible during the (re)programming of the responder. For this purpose the transmitter is provided with adjusting means 25, shown diagrammatically, by means of which the energy transmitted by the transmitter through aerial 2 can be adjusted.

In order to determine the optimum transmission energy level for the (re)programming, the transmission energy is gradually increased from a low value. At a certain threshold value, the supply voltage across the buffer capacitor 8 in a responder being programmed will reach such a level that the Zener diode 26, which for security reasons will often be present anyway, becomes operative. At that moment there will be a sudden change in the amount of field energy absorbed by the responder. Such a leapwise change can be detected in a simple manner by detection means 3. The transmitter can then be adjusted, for example automatically through a line 27, to a level at which the Zener diode 26 is just not operative.

If desired, the transmitter can be arranged so that after energizing the programmer 21, the variation of the transmission energy and the subsequent adjustment of the optimum transmission energy level take place fully automatically.

FIG. 3 shows, at a, the signal across the receiver circuit of a responder during normal operation and, at b, during the (re)programming. FIG. 3a shows two periods of time CI, during which a responder generates a coded signal in an interrogation field. The periods of time CI alternate with pre-determined intervals P, during which energy is transferred only.

FIG. 3b shows that, in the intervals P, the signal is modulated for (re)programming a responder in the intervals P. As stated before, the transmission energy is then set at an optimum value. In addition, the programmer is preferably arranged so that the modulation depth caused by the programmer does not exceed a pre-determined value, e.g., 50% of the amplitude.

Besides by means of detection of the field absorption, the transmission of the encoded information from the responder can also be effected by switching from transmission to receiving, and this at the same frequency, in the periods of time CI in which this transfer is to take place. For this purpose, the coil or aerial of the transmitter can be switched to a receiver in these periods. Also, of course, use can be made of a receiver with its own coil or aerial.

To enable this form of transfer, which has the advantage of being less sensitive to interference as a result of, for example, the presence of metal, the electric circuit in the responder has to provide itself for the transfer signal with the correct frequency in the periods of time in which no transmission signal is present. Depending on the amount of energy in the energy buffer, this can also comprise a plurality of time zones.

FIG. 4 shows diagrammatically a responder suitable for this purpose. The receiver circuit of the responder is connected to an amplifier circuit 40, so that, upon receiving a signal from the transmitter this amplifier circuit passively follows the phase of the transmission signal presented, but when the transmission field drops out will begin to actively oscillate at the same frequency.

The transfer of the coded information from the responder to the transceiver can then take place in the same manner as in the transfer through modulation of the field absorption, namely, by modulating the electrical characteristics of the receiver circuit in the responder. Also, to save energy, an inhibit line 41 could be provided in the amplifier, for example, by giving it the form of a so-called "NAND" gate. This last is especially of importance if a battery is added to increase the detection range.

It is observed that, after reading the above, various modifications will readily occur to those skilled in the art. Thus, a responder could be arranged so that only a portion of the code can later be changed. If desired, a portion of the code defining means or memory can be used to indicate that in this portion and/or another portion the code must not be changed. Also, a responder can be arranged so that a portion of the code stored in the code defining means can be varied under the influence of signals from one or more sensors coupled to the responder. These may be, for example, sensors for physical or (bio)chemical parameters, such as blood pressure, temperature, pressure, heart rate, eye pressure, concentration of certain substances, etc. Such modifications are to be considered to be within the scope of the present invention.

We claim:

1. In an electronic identification system including a transmitter for generating an electromagnetic interrogation field in a detection zone, at least one passive responder for disturbing the interrogation field, detection means for detecting a disturbance of the interrogation field caused by the at least one passive responder, the at least one passive responder comprising a single receiver circuit and a switch means, rectifier means connected between the single receiver circuit and an active digital encoding means for encoding a binary-code, said encoding means connected, in operation, through the switch means, to vary during first predetermined intervals the electrical characteristics of said receiver circuit to generate a code signal corresponding to said binary code, which code signal is detectable by said detection means, said encoding means controlling the switch means during first predetermined intervals for varying the electrical characteristics of said receiver circuit, which first predetermined intervals alternate with second predetermined intervals during which the electrical characteristics of the receiver circuit are not affected, the improvement comprising said encoding means further including a decoding section which in response to a modulation of the interrogation field, during said second predetermined intervals, at least in part, reprograms the binary code, and programmer means in the transmitter for modulating the interrogation field during said second intervals.

2. An electromagnetic identification system as claimed in claim 1, characterized in that the transmitter comprising a programmer means is the same transmitter which normally generates an interrogation field in a detection zone.

3. An electromagnetic identification system as claims in claim 1, wherein the responder comprises a Zener diode which limits the supply voltage provided by the rectifier means to a predetermined threshold value, and the transmitter comprise adjusting means for varying the energy transmitted, the adjusting means for adjusting the energy transmitted to an energy level corresponding to said predetermined threshold value of the supply voltage during programming.

4. An electromagnetic identification system as claimed in claim 3, wherein the programmer includes means for effecting, starting from the energy level corresponding to the predetermined threshold value of the supply voltage, an amplitude modulation of the interrogation field with a modulation depth not exceeding a predetermined maximum value.

5. An electromagnetic identification system as claimed in claim 3, wherein the detection means includes means for detecting, upon variation of the energy transmitted, a sudden change of the amount of energy absorbed by a responder, and to provide a corresponding signal to the adjusting means.

6. An electromagnetic identification system as claimed in claim 1, wherein the binary-code defining means comprises an EEPROM.

7. In an electromagnetic identification system including a transmitter for generating an electromagnetic interrogation field in a detection zone, wherein the transmitter is arranged to intermittently generate said interrogation field and at least one responder to generate an oscillation signal and a coded signal in response to the oscillation signal after the interrogation field drops out, detection means for detecting the coded signal degenerated by the at least one passive responder, the at least one passive responder comprising a single receiver circuit including a switch means, rectifier means connected between the single receiver circuit and an active digital encoding means for encoding a binary-code, said encoding means connected in operation, through the switch means, to vary, during predetermined first periods of time, the electrical characteristics of said receiver circuit to generate a code signal corresponding to said binary-code, which code signal is detectable by the detection means, said encoding means controlling the switch means during said first predetermined periods of time for varying the electrical characteristics of said receiver circuit when the interrogation field drops out, which first predetermined periods of time alternative with second predetermined periods of time during which the electrical characteristics of the receiver circuit are not affected, the improvement comprising said encoding means further including a decoding section which in response to a modulation of the interrogation field during said second predetermined periods of time, at least in part reprograms the binary code, and programmer means for modulating the interrogation field, during said second predetermined periods of time.

8. An electromagnetic identification system as claimed in claim 7, wherein said responder is provided with an amplifier which after the interrogation field drops out, together with the receiver circuit, forms an oscillator tuned to the frequency of the interrogation field and withdraws energy from an energy buffer provided in said responder.

9. An electromagnetic identification system as claimed in claim 8, wherein said amplifier comprises an inhibit input that is energized so long as the responder withdraws energy from the receiver circuit.

10. A responder for use in an electromagnetic identification system in which a transmitter generates an electromagnetic field in a detection zone, and the responder is for disturbing the interrogation field, and detection means are provided for detecting a disturbance of the interrogation field caused by the responder, the responder comprising a single receiver circuit responsive to the interrogation field, said responder including switch means, rectifier means connected between the single receiver circuit and n active digital encoding means, for encoding a binary-code, said encoding means for varying, in operation, through said switch means, the electrical characteristics of said receiver circuit to generate a code signal corresponding to said binary code which code signal is detectable by the detection means, said encoding means for controlling the switch means, during predetermined periods of time for varying the electrical characteristics of said receiver circuit, which predetermined periods of time alternate with intervals during which the electrical characteristics of the receiver circuit are not affected, said encoding means comprises a decoding section which in response to a modulation of the interrogation field during said intervals, at least in part, reprograms the binary code.

11. A method of programming and reprogramming the code of a coded responder which forms part of an electromagnetic identification system and is arranged to form supply energy from an interrogation field and in response to said interrogation field to generate a code signal during predetermined periods of time alternating with time intervals, said code signal being in accordance with a binary code comprising the steps of generating said interrogation field, modulating said interrogation field to vary its energy, absorbing interrogation field energy by the coded responder, detecting a sudden increase in energy absorbed by the responder, adjusting the energy level of the interrogation field corresponding to the detected energy level; modulatin the interrogation field in accordance with a desired code, which code is the responder in the response to the modulated interrogation field by storing the decoded code in the responder.

* * * * *